(12) United States Patent
Dumoulin et al.

(10) Patent No.: US 11,100,081 B2
(45) Date of Patent: Aug. 24, 2021

(54) METHODS FOR LOADING A PROFILE TO A SECURE ELEMENT, MANAGER AND PERSONALISABLE SECURE ELEMENT

(71) Applicant: IDEMIA France, Courbevoie (FR)

(72) Inventors: Jérôme Dumoulin, Courbevoie (FR); Marc Pardieu, Courbevoie (FR); Cyrille Fougerouse, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 187 days.

(21) Appl. No.: 16/165,564

(22) Filed: Oct. 19, 2018

(65) Prior Publication Data

US 2019/0121797 A1 Apr. 25, 2019

(30) Foreign Application Priority Data

Oct. 20, 2017 (FR) .................................... 1759930

(51) Int. Cl.
*G06F 16/23* (2019.01)
*H04W 8/20* (2009.01)
(Continued)

(52) U.S. Cl.
CPC ........ *G06F 16/2358* (2019.01); *G06F 16/122* (2019.01); *G06F 16/1873* (2019.01); *H04W 8/20* (2013.01)

(58) Field of Classification Search
USPC ....................................................... 707/695
See application file for complete search history.

(56) References Cited

U.S. PATENT DOCUMENTS 5,727,197 A * 3/1998 Burgess ................. G06F 16/284
6,810,259 B1 * 10/2004 Zhang ..................... H04W 8/18
455/435.1

(Continued)

FOREIGN PATENT DOCUMENTS

EP 1 503 602 A1 2/2005
EP 3 288 300 A1 2/2018

OTHER PUBLICATIONS

European Telecommunications Standards Institute, Simalliance: "IS on first drafts of Profile Package technical specification V2.0 and Test specification V1.0", ETSI Draft, 2016, pp. 1-79, XP014269952.

(Continued)

*Primary Examiner* — Cam Linh T Nguyen
(74) *Attorney, Agent, or Firm* — Nixon & Vanderhye

(57) ABSTRACT

Disclosed is a method for loading, by a manager, a profile into a memory of a secure element, SE. A profile allows the SE to identify itself to a service. The profile includes a profile element created by reference to a template. A template is identified by an OID identifier, which it keeps despite changes. The manager may transmit an audit request or update the operating system of the SE in order to obtain, in response, a piece of information representative of the version of the template stored by the SE. The manager then identifies any difference in version with the corresponding template it holds. In case of difference, the template of the SE or the template of the manager is updated so as to align their versions. Thus, a profile generated on the basis of this version of the template will be loaded, without malfunction, by the SE.

20 Claims, 4 Drawing Sheets

(51) Int. Cl.
    *G06F 16/18*     (2019.01)
    *G06F 16/11*     (2019.01)

(56) References Cited

U.S. PATENT DOCUMENTS

| | | |
|---|---|---|
| 7,389,119 B2 | 6/2008 | Weigele |
| 7,983,704 B2 | 7/2011 | Weigele |
| 8,463,322 B2 | 6/2013 | Weigele |
| 2015/0058302 A1* | 2/2015 | Abney, III .......... G06F 16/2365 707/692 |
| 2016/0286335 A1 | 9/2016 | Koganti et al. |
| 2017/0249327 A1* | 8/2017 | Gowdappa ............ G06F 16/188 |

OTHER PUBLICATIONS

French Search Report, dated May 25, 2018, from corresponding FR application No. 1759930.
ETSI, "ETSI TS 103 383 Technical Specification—Smart Cards; Embedded UICC; Requirements Specification", 2016, V13.2.0, Release 13.
GSM Association, "SGP.02—Remote Provisioning Architecture for Embedded UICC Technical Specification", 2016, Version 3.1.
Simalliance, "eUICC Profile Package: Interoperable Format Technical Specification", 2016, Version 2.0.
ETSI, "ETSI TS 102 221 Technical Specification—Smart Cards; UICC Terminal interface; Physical logical characteristics", 2016, V13.1.0, Release 13.
Afnor, International ISO/IEC 7816-4, 2013.
GSM Association, "SGP.02—Remote Provisioning Architecture for Embedded UICC—Technical Specification", 2017, Version 3.2.

* cited by examiner

METHODS FOR LOADING A PROFILE TO A SECURE ELEMENT, MANAGER AND PERSONALISABLE SECURE ELEMENT

FIELD OF THE INVENTION

The invention relates to the field of remote personalization of secure elements. It in particular relates to methods for managing profile-element templates, to a manager of profile-element templates and to a personalizable secure element.

CONTEXT OF THE INVENTION

A secure element, for example a chip card, may be used in various host devices or pieces of equipment (mobile terminal, smart phone, tablet computer, electricity meter, vehicle, etc.).

In particular, the secure element may be removably incorporated into the host device or embedded (for example soldered) therein.

A first type of secure element are the cards referred to as UICCs (universal integrated circuit cards), which are specified in the standard ETSI TS 102 221 and which encompass the conventional removable chip cards known as SIMs (or USIMs for universal subscriber identity modules) but also secure tokens, all of which are uniquely identifiable.

A second type of secure element is known as an eSE (for embedded secure element) and specified in the GlobalPlatform Card Specification Version 2.2.1, which specification relates to GlobalPlatform standards. This second type of secure element is intended to be embedded, i.e. to be irremovable.

By way of example, the embedded secure element may be an eUICC (acronym of embedded universal integrated circuit card), such as specified in standard ETSI TS 103 383.

In the rest of the document, for the sake of simplicity, the generic term "card" or "secure element" will be used to designate all of the various aforementioned secure elements, which are generally used for identification purposes (for example in a mobile phone network).

To mitigate the fact that the user cannot simply change the secure element embedded into the host device with another secure element or quite simply does not want to perform the operations required to exchange a secure element in the host device, the user is sometimes not able to change the unique identifier that allows him to identify himself.

Provision is then made for the secure element to be able to operate with a plurality of different profiles that are each identified by a single identifier and that are stored in or loaded into the secure element. Thus, a plurality of different profiles may be present on a given secure element, for example a given eUICC.

Technically, a profile, for example such as defined in the document 'SGP.02—Remote Provisioning Architecture for Embedded UICC Technical Specification—Version 3.1—27 May 2016' is a secure environment able to comprise a combination of a file structure (in particular taking the form of elementary files or EFs and/or dedicated files or DFs), of data and of applications allowing, when the profile is activated, services (e.g. voice services, data services) provided by a specific network operator, typically a mobile network operator, to be accessed. It will be noted that only a single profile may be active at a time.

In principle, these profiles may be managed either by a remote server (machine-to-machine or M2M system), or locally by an application installed on the eUICC, or even manually by the user himself.

These profiles may be created remotely by personalization infrastructure. In practice, this personalization infrastructure is controlled either by the operator itself, or on behalf of the operator by a third party (e.g. the Profile Creator defined in the document 'eUICC Profile Package: Interoperable Format Technical Specification V2.0' SIMALLIANCE) and generates PPs (profile packages) depending on the desires of the operator.

Such a profile package, referred to simply as a "profile" below, represents the data structure of the profile to be installed and is transmitted to the eUICC in order to be loaded and installed thereby. Advantageously, the same description format is used by the third-party, the operator and the provider of the eUICC, thereby allowing interoperability between these entities to be assured.

In practice, a profile includes a set of PEs (profile elements) using a description language that is independent of the transport protocol. Each profile element represents one or more characteristics of the profile and is described individually so that it may be processed by the eUICC independently of the other profile elements, while however respecting a few specific sequencing constraints.

Generally, a profile element may include a file, a reference to a system file structure, a set of parameters of a network access application, an interoperable application, access rights, etc. For example, a profile element may be one of the following types: PE-Header or PEH (signals the start of a profile), PE-MF (master file—directory file in which the main files of the profile are located), PE-CD (configuration data—directory file in which configuration files are located), PE-TELECOM (directory file in which elementary files related to telecom functionalities are located), PE-USIM (universal subscriber identity module—directory file in which elementary files related to the identification of a subscriber on a mobile network are located), PE-ISIM (IP multimedia services identity module—directory file in which elementary files related to the identification of a subscriber on an IP network are located), PE-PINCodes (directory file in which elementary files related to the management of PIN codes are located), PE-SecurityDomain (directory file in which elementary files related to the creation of a security domain are located), PE-Application (directory file in which elementary files related to the loading of an application are located), PE-End (signals the end of a profile), etc.

A profile element of PE-Header type signaling the start of a profile delivers various pieces of information on the content of the profile, for example a list of services that must be supported by the eUICC, in which list each service is stamped with an indicator specifying whether the service is essential or optional. Any profile element, in particular related to such a service, may include such an indicator.

To decrease the amount of the data in the profile to be transmitted, provision is made for the profile elements to be able to make reference to one or more templates and to deliver pieces of information that complement the templates (sometimes replacing default values). A template may comprise data/pieces of information relating to all or part of a profile element, or even to a plurality of profile elements. A profile is generally created using these templates.

The profiles must comply with the specifications of a number of ETSI standards (e.g. ETSI TS 102 221 V13.1.0 (2016 May)). This constraint has led the SIMALLIANCE organization to define a plurality of templates in which the file system may take default values (file identifiers, access rights, etc.) defined by the standards to which it refers. These templates therefore define a data format by setting default values for certain parameters, and hence their use allows the creation of a profile by the aforementioned personalization infrastructure, and the installation of this profile into the eUICC, to be facilitated and accelerated by decreasing the data to be transmitted.

To do this, the templates are beforehand (for example, during a phase of pre-personalization or personalization of the secure element) loaded into the memory of the eUICC. A template, when it is loaded with given values allowing it to be "personalized", allows a personalized profile element to be described. In practice, each template is associated with a unique object identifier called the OID (for object identifier) in order to be uniquely identified.

According to the architecture proposed by the GSMA for remote loading profiles into secure elements via OTA (over the air), the profile elements, including a reference (the OID) to any templates used, are sent by a SM-SR (subscription management-secure routing) transport server to the main or root security domain ISD-R (issuer security domain root) of the eUICC. In a specific configuration and architecture, proposed by the GSMA (known as the "consumer mode"), the transmission may also be carried out directly via an SM-DP+ transport server to the ISD-R profile security domain.

On reception of a new profile element to be loaded and installed comprising one or more references (OIDs) to templates, it is enough, to construct a complete profile element for the eUICC, for the eUICC to load the one or more templates thus referenced into the memory of the eUICC and to merge the values of each template loaded into memory with the values received in the profile element that makes reference thereto. By merge, what is meant is the fact of that the data of the received profile element are used as a priority and completed using the data of the one or more referenced templates present in memory when data are not present in the received profile element.

In practice, the eUICC successively loads and installs each profile element forming a profile to be loaded.

The templates define a certain number of pieces of information (for example files or elementary files) forming the profile elements, which may change over time (for example their size, their values, etc. may change), depending, for example, in changes to specific standards.

It is therefore possible that a profile element may be designed with reference to a template that has changed and may be merged, by the eUICC, with a template that does not account for this change. The result of the merge may then have an unexpected format. In this case, an error message may be returned. Even if the obtained format is in accordance with the expected format, it is possible that the loading of the profile or indeed even the execution of the profile or of a functionality related to the profile element output from the merge will malfunction and also generate an error message.

In fact, in this illustrative case, for a given template OID identifier, the personalization infrastructure or the operator relies on an updated template to describe the profile element, whereas the eUICC relies on a different template (with the same OID but not updated) to recreate (by merging) the final profile element. The inverse situation may also occur, with an eUICC relying on an updated template and the personalization infrastructure or operator relying on a template (same OID) that is not updated to describe the profile element.

This situation is unsatisfactory.

There is therefore a general need to improve the management of the templates used during the loading (i.e. creation, installation or update) of profiles into a secure element.

SUMMARY OF THE INVENTION

The objective of the present invention is thus to mitigate at least one of these drawbacks.

In this context, the invention firstly relates to a method for loading a profile into a memory of a secure element, comprising, in a server remote from the secure element, the following steps:

obtaining a piece of information representative of a version of a profile-element template stored in the memory of the secure element, determining a difference in version between the obtained version and a version of the same template (in particular having the same OID identifier) stored in a memory accessible to the remote server, in case of determination of a difference, updating at least one among the template stored in the memory of the secure element and the template accessible to the remote server, in order to align their versions, generating a profile including a profile element making reference to said template accessible to the remote server, in its aligned version, and subsequently to the updating step, transmitting, to the secure element, the generated profile.

Correspondingly, the invention relates to a profile manager for the personalization of a secure element by profile loading, the manager comprising at least one microprocessor configured to:

obtaining a piece of information representative of a version of a profile-element template stored in a memory of the secure element, determining a difference in version between the obtained version and a version of the same template stored in a memory accessible to the manager, in case of determination of a difference, updating at least one among the template stored in the memory of the secure element and the template accessible to the manager, in order to align their versions, generating a profile including a profile element making reference to said template accessible to the manager, in its aligned version, and subsequently to the updating step, transmitting, to the secure element, the generated profile.

These arrangements allow the profile-element-template versions of the manager (or remote server) and of the secure element to be aligned, at low cost, so that a profile created with these template versions and subsequently loaded into the secure element does not malfunction.

Optional features of embodiments of the invention are defined in the claims, mainly in method terms. Of course, these features may be transposed to structural features of the manager.

In one embodiment, the method furthermore comprises a step of transmitting a request comprising a command in order to obtain, in response, said piece of information. This allows the manager to initiate the obtainment of pieces of information relating to the templates stored in the secure elements, and thus to control the flux of responses therefrom.

According to one particular embodiment, the transmission of the request is triggered by the occurrence of one triggering event among: the passage of a predefined amount of time measured by the remote server; a demand, received from a third party, to load a profile into the secure element; the update or the expiry of a template stored in the memory accessible to the remote server. Thus, the manager may make requests to secure elements at key moments, liable to have an impact on the future profiles to be loaded.

According to another particular embodiment, the request comprises a command of "case 4" type according to the description given in the latest version of standard ISO7816-4, published August 2014 (for example a GET DATA command of the GlobalPlatform standard). For the sake of simplicity, in the rest of the document, we will mainly make reference to a command based on the GET DATA command of the GlobalPlatform standard. This arrangement makes it possible to not have to modify communication interfaces between the manager and the secure elements.

In another embodiment, the step of obtaining said piece of information is in response to a prior step in which the secure element is updated (for example update of the operating system) by the remote server. This arrangement limits the exchanges required between the manager and the secure element to track the status of the templates that the latter holds.

According to one particular embodiment, the prior updating step comprises updating an operating system of the secure element. Specifically it is a question of an important update of the secure element, which most often has an impact on many files potentially including the profile-element templates stored by the secure element.

According to another particular embodiment, the step of obtaining said piece of information is in response to a triggering event post prior update, among: a first connection or network authentication of the secure element; and an event of use of a command or procedure defined by an interface of the secure element, allowing, for example, an interaction between the secure element and the terminal, also referred to as toolkit. This arrangement allows the risks of the manager being subject to a peak load when processing the responses of a fleet of secure elements to be limited. Specifically, it is conventional for a manager to trigger a collective update of a fleet of secure elements. By virtue of the triggering event, the responses of the secure elements are not transmitted simultaneously, but shifted (in a way that is nonuniform over the fleet) to the moment of occurrence of said triggering event.

With regard to these embodiments, the microprocessor of the manager is then also configured to transmit a request comprising a command to obtain, in response, said piece of information or to transmit a command to update an operating system of the secure element to obtain, in response, said piece of information.

In another embodiment, the piece of information representative of a version of the profile-element template comprises one or more among: a version number of said template, an expiry date of said template and a hash value calculated from said template. These pieces of information may easily be integrated into metadata fields of the templates, and take up little space in the transmitted responses. Thus, this arrangement allows memory usage and bandwidth to be minimized.

In another embodiment, said step of determining a difference comprises determining a difference between the obtained version of the template stored in the memory of the secure element and the version of the template used to generate the profile to be sent, and the step of updating in case of difference comprises transmitting a command to update the template stored in the memory of the secure element to the template used to generate the profile to be sent.

This arrangement allows the secure element to be updated with a profile created beforehand by the manager. The processing carried out in the latter is thus limited.

According to one particular embodiment, the update command comprises a STORE DATA command of the GlobalPlatform standard. Thus, the invention does not require communication interfaces of the manager and of the secure element to be modified.

In another embodiment, the step of updating in case of difference comprises, prior to the generating step, updating the template accessible to the remote server to make it correspond to the obtained version of the template of the secure element, so that the profile to be sent is generated using the updated template.

The correct version of the template may be obtained by the manager from a third-party/dedicated server or indeed locally from a collection of templates. To do this, the manager may for example rely on another piece of information contained in the response that identifies a manufacturer of the secure element or a server of the latter.

This arrangement allows exchanges with the secure elements to be limited since both the manager and the profile to be loaded are adapted (the first is updated, the second is generated) to the configuration of the secure element (in terms of version of the templates used).

From secure-element perspective, the invention also relates to a method for loading a profile into a memory of a secure element, comprising, in the secure element, the following steps:

transmitting, to a remote server, a piece of information representative of a version of a profile-element template stored in the memory of the secure element, in response to this transmission, receiving and executing a command to update the profile-element template stored in memory, said command being transmitted by the remote server, subsequent to the updating step, receiving a profile to be loaded, said profile being transmitted by the remote server, the profile to be loaded including at least one profile element making reference to said template stored in memory, and loading and installing, into memory, the received profile by merging it with the stored template to which it makes reference.

Correspondingly, it also relates to a personalizable secure element comprising at least one microprocessor configured to:

transmit, to a remote server, a piece of information representative of a version of a profile-element template stored in a memory of the secure element, in response to this transmission, receiving and executing a command to update the profile-element template stored in memory, said command being transmitted by the remote server, subsequently to the updating step, receiving a profile to be loaded, which is transmitted by the remote server, the profile to be loaded including at least one profile element making reference to said template stored in memory, and loading and installing, into memory, the received profile by merging it with the stored template to which it makes reference.

The present invention from secure-element perspective has the same advantages as those described above with reference to the remote server. Furthermore, optional features are also provided, for example such as defined in the claims, mainly in method terms.

For example, in one embodiment, the step in which said piece of information is transmitted by the secure element is in response to the reception of a request sent by the remote server, comprising a command to obtain, in response, said piece of information. The request may comprise a command of "case 4" type according to the description given in standard ISO7816-4 (for example a GET DATA command of the GlobalPlatform standard).

In another embodiment, the step in which said secure element transmits said piece of information is in response to a prior step in which the operating system of the secure element is updated by the remote server.

In particular, the step in which said piece of information is transmitted by the secure element may be in response to a triggering event post prior update, among: a first connection or network authentication of the secure element; and an event of use of a command or procedure defined by an interface of the secure element, allowing, for example, an interaction between the secure element and the terminal, also referred to as toolkit.

In these embodiments, the microprocessor of the secure element is then also configured to generate and to transmit said piece of information in response to the reception of a request sent by the remote server, comprising a command to obtain, in response, said piece of information, or in response to a prior step in which the operating system of the secure element is updated by the remote server.

According to one particular embodiment, the secure element transmits a said piece of information representative of a profile-element-template version for each template stored in the memory of the secure element. This arrangement allows the manager to obtain a complete view of the state of the secure element.

As a variant, it may do it solely for each template stored in the memory of the secure element that was modified during the prior update of the operating system. This decreases the size of the response transmitted by the secure element. The communication network is then less encumbered, and the processing load on the manager is decreased.

In the context of this variant, the method may also comprise, before the prior step of updating the operating system (therefore for example on reception of a command to update the OS), a step of storing in memory pieces of information relating to all or some of the profile-element templates stored in the memory of the secure element, and the one or more templates modified during the prior update of the operating system are then identified using the pieces of information stored in memory.

This arrangement allows the templates modified by the update of the OS to be identified at low cost.

In another embodiment, the piece of information representative of a version of the profile-element template comprises one or more among: a version number of said template, an expiry date of said template and a hash value calculated from said template.

In another embodiment, the command sent by the remote server to update the profile-element template comprises a STORE DATA command of the GlobalPlatform standard.

In one particular embodiment, the various steps of the aforementioned methods are determined by computer-program instructions.

Therefore, the invention also relates to a data medium readable by a microprocessor, comprising instructions of a computer program for implementing one of these methods, when they are loaded and executed by the microprocessor.

This program may use any programming language, and take the form of source code, object code or code intermediate between source code and object code, such as code in a partially compiled form, or in any other desirable form.

The data medium may be any entity or device capable of storing the program. For example, the medium may comprise a storing means, such as a ROM, for example a microcircuit ROM, or even a magnetic recording means, for example a hard disk, or even a flash memory.

Furthermore, the data medium may be a transmissible medium such as an optical or electrical signal, which may be conveyed via an optical or electrical cable, by radio or by other means. The program may in particular be downloaded from a storage platform of a network such as the Internet, a communication network or indeed a telecommunications network.

Alternatively, the data medium may be an integrated circuit into which the program is incorporated, the circuit being suitable for executing or for being used in the execution of the one or more methods in question.

The data medium containing the computer program has features and advantages that are analogous to those of the methods that the program puts to work.

BRIEF DESCRIPTION OF THE FIGURES

Other particularities and advantages of the invention will become more clearly apparent from the following description, which is illustrated by the appended figures, which illustrate example embodiments thereof that are devoid of any limiting character. In the figures.

DETAILED DESCRIPTION OF THE INVENTION

Figure 1:
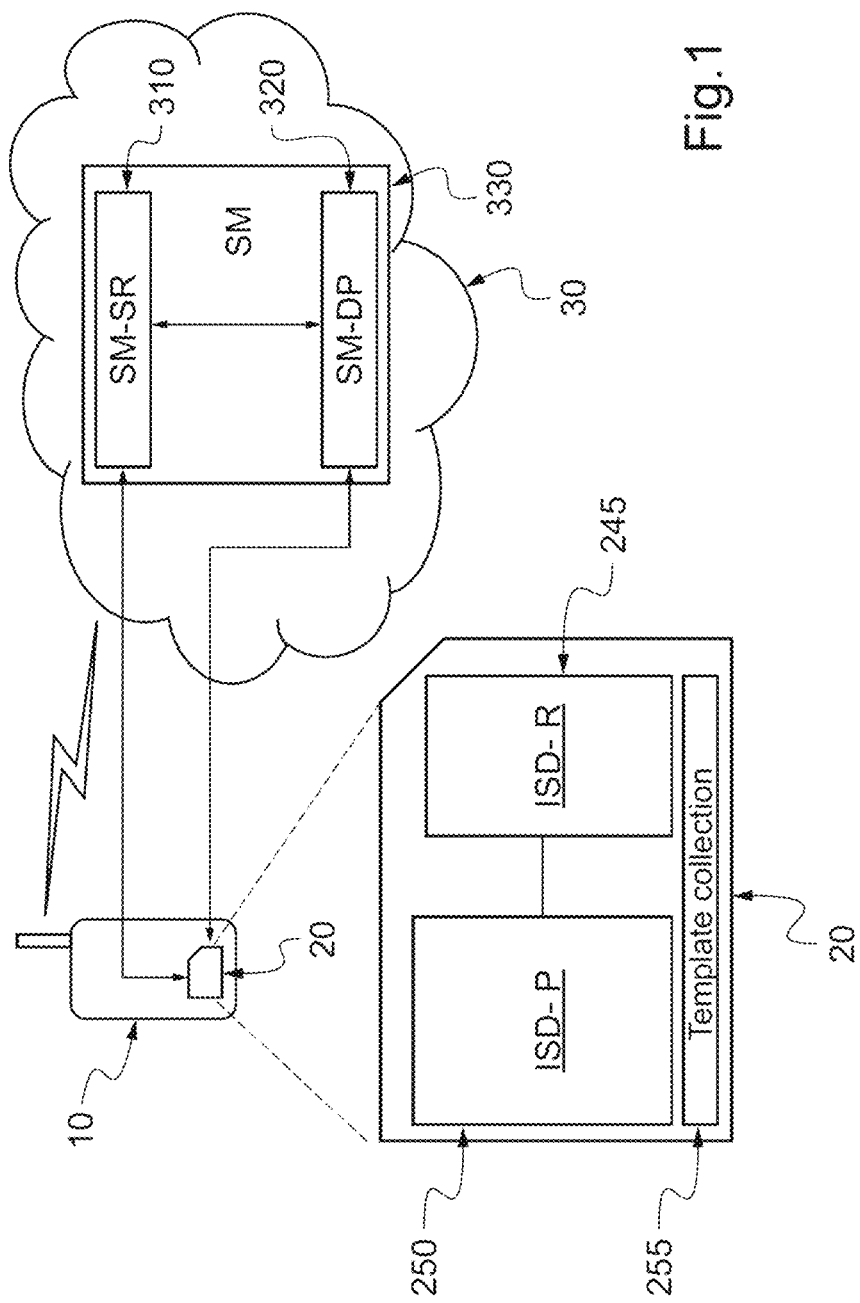
FIG. 1 illustrates, in a simplified way, an example of a communication system in which embodiments of the present invention may be implemented.

Generally, the invention relates to the loading (including the creation, installation or update) of one or more profiles used to personalize a secure element, the description(s) of this profile or these profiles relying on at least one template. These templates are used to format the data of the profile elements forming profiles, in order to facilitate the creation of new profiles and their installation into the secure element.

According to the present invention, pieces of information representative of a version of at least one template located in a memory of the secure element are transmitted from the secure element to a remote server or manager. By manager, what is meant is an entity corresponding, for example and nonlimitingly, to at least one server having at least one role in preparing and/or installing and/or managing profiles, for example, an SM-DP (for subscription manager data preparation) and an SM-SR (for subscription manager secure routing) or SM-DP+ (SM-DP enhanced) server, and responsible for loading, in a secure way, profiles into the secure element.

By "version" of a template, what is meant is an edition or a given state of the life of the template at a given moment. In the computational field, it is generally a question of a state that is judged to be stable and that allows the template to be used (and more generally the software package in question to be executed).

By extension, the "version" of the template also makes reference to a piece of information that allows this state to be identified at a given time. As will be seen below, this version is at least one piece of information among the plurality of pieces of information forming the metadata of the template and able to be of different type or orientation, for example the versioning (major and minor version of the template) of the template, the validity of the template (expiry date) and the authenticity (hash value) of the template.

In certain embodiments, these pieces of version information are transmitted by the secure element in response to the transmission, by the remote server/manager, of a command to the secure element.

For example, the command may be a command to update the secure element (in particular its operating system or OS), such that the pieces of information are transmitted after the secure element has been updated (for example following an update of the OS) by a third party server. Optionally, the transmission of the pieces of information may be dependent on other events, such as a first connection of the updated secure element to a communication network or an event allowing, for example, an interaction between the secure element and the terminal (toolkit) (in other words the use of a command or procedure defined by the interface toolkit with the secure element).

In other examples, the command may be a TEMPLATE AUDIT REQUEST (created by the inventors) the objective of which is to obtain said information on all or some of the templates stored in the memory of the secure element. It is envisionable, as described below, for a plurality of events to trigger this request, these events including the passage of a predefined amount of time (for a periodic interrogation), the demand to load a profile into the secure element (demand received by a third party for example), the creation of a new profile, the update or the expiry of a template.

The pieces of information sought and transmitted by the secure element are those that give a template its structure and that form what are called the metadata, the role of which data is to describe the characteristics of the template. At the present time, the only metadata provided for by and included in state-of-the-art, corresponding to the SIMALLIANCE standard, is a unique identification number, the OID, of the template. This OID identification number is preserved even when the template is changed.

In order to allow compatibility processing according to the invention, the inventors therefore proposed to add one or more new pieces of information by way of new fields created to this end in the conventional structure (metadata) of the templates.

Thus, according to embodiments, the new pieces of information in question may comprise one or more among:
one or more version numbers (the versioning) of the template,
an expiry date of the template,
a hash value calculated from the entirety of the template (namely, taking into account the values of the metadata of the template in question and the value of the content of the template in question).

The TEMPLATE AUDIT REQUEST (created by the inventors) thus aims to gather all or some of these various pieces of information forming the metadata of one or more templates, so as to allow a version of the one or more templates in the memory of the secure element to be precisely determined.

These demanded pieces of information may therefore be entirely or partially contained (for example a combination of these pieces of information may be contained) in the response that is transmitted back by the secure element.

In one extra secure embodiment, all the returned pieces of information (or even all of the useful or payload portion of the response) may be signed and/or optionally encrypted in order to ensure the authenticity of the response with respect to the secure element and/or optionally to ensure the integrity of the data of the response. The decision to encrypt or sign all or some of the pieces of information contained in the response may depend on an indicator, for example a responseToCipher field, delivered in the request of the manager.

By way of illustration, the returned pieces of information may be contained in a response, details of which are given below, called the TEMPLATE AUDIT RESPONSE (created by the inventors), to the TEMPLATE AUDIT REQUEST.

The embodiments described below concentrate, for the sake of simplicity and nonlimitingly, mainly on pieces of information of template-version-number type. However, all or some of the various pieces of information (metadata) may be used to detect a difference in version between a stored template, accessible or used by the manager, and a corresponding template (i.e. a template bearing the same OID identifier) stored in the memory of the secure element. Furthermore, for the sake of clarity, the example of a single template is mainly used in these embodiments, whereas a plurality of templates may be processed at the same time in the context of the present invention.

According to a first embodiment, on the basis of these pieces of information, the manager may determine whether there is a difference in version between the template located in the secure element and a template used to create a profile element in a remote server, for example the SM-DP server. The profile element is for example created in the context of generation of a new profile to be loaded into the secure element. If a difference in version is determined, the template stored in the memory of the secure element may be updated in order to bring it to the level of that of the manager, i.e. in order to align it therewith (i.e. to make the metadata and/or content data forming the template identical). Once this update of the template of the secure element has been carried out, the manager, which generated the new profile from the local template, may transmit it to the secure element, which may then correctly process it on reception because it now has available to it the updated template, i.e. the same version of template as that used to generate the received profile.

In the case where a plurality of templates are employed to generate the new profile to be loaded (for example a plurality of profile elements each of which makes reference to at least one template), this update is, of course, expanded to and carried out for each of the templates referenced in the new profile to be loaded, that have a difference in version with the same template stored in the secure element.

According to a second embodiment, the received pieces of information allow the manager to identify the version of the template stored in the secure element. In this case, the manager may be updated so that its template is in the same version as that of the secure element, and the manager may thus use the updated template (having the identified version) to create a profile element of the profile to be loaded into the secure element. In this way, the manager is sure to generate a profile based on the same template version (for each template) as that present in the secure element. The manager then transmits the generated profile to the secure element, which processes it on reception using the template stored in memory.

Thus, in these various embodiments, the secure element is able to process the profile element by virtue of the pieces of metadata information obtained by the manager, which allow either provision to be made for an update of the template stored locally within the secure element, or, the profile to be loaded (and therefore each and every profile element included therein) to be formatted at manager end so that it can be processed with the template existing in the secure element.

Of course, these steps are described for a single template and a single profile element but may in principle be applied without additional difficulty to all the profile elements of a profile to be loaded and to the corresponding templates used to format their data.

FIG. 1 illustrates, in a simplified way, an example of a communication system in which embodiments of the present invention may be implemented.

In this schematic representation a host device 10 hosting a secure element 20, for example an eUICC card, is shown.

The host device 10 is for example a mobile terminal, a smart phone, a tablet computer or even any other piece of electronic equipment such as an electricity meter, a vehicle, a coffee machine, etc.

The host device 10 and the secure element 20 for example communicate by means of APDU (for application protocol data unit) commands according to standard ISO 7816.

Of course, a communication system generally includes a plurality of such host devices equipped with embedded secure elements. The present invention in particular implements particular operations in the embedded secure element.

The communication system also comprises a communication network 30. This network 30 is for example a mobile telephone network comprising, in the conventional way, base stations (not shown) for connecting the mobile terminals, and a plurality of entities (GMSCs, HLRs, MSC servers, VLRs, etc.) which are not shown.

Generally, the network 30 comprises a subscription managing entity (or manager) SM 330 (subscription manager) forming a remote server and represented here by two separate server modules: a secure transport or routing server SM-SR 310 (for subscription manager secure routing) and a data-preparation server SM-DP 320 (for subscription manager data preparation).

The SM-DP data-preparation server 320 is in particular in charge of preparing profile data and of managing the loading and secure installation thereof into the secure element 20.

The SM-SR secure routing server 310 is in particular in charge of transporting, in a secure way, commands (and therefore command scripts) to load, install and manage profiles to the secure elements of the network.

These two servers are suitable for communicating together within the SM entity 330, and with the host device 10 and the secure element 20 that is incorporated therein. For the sake of simplicity, reference is mainly made to the SM entity (manager) when it is a question of an operation to be carried out by either one of the two SM-DP and SM-SR servers, or any other type of server participating in subscriber management, profile management, management of the secure element or of its content in the broadest sense.

In this example, the secure element 20 comprises a plurality of security domains, here two referenced 245 and 250, such as defined by the standard GSMA—Remote Provisioning Architecture for Embedded UICC—Technical Specification—Version 3.2-27 Jun. 2017, that are independent of each other for reasons of security and of confidentiality of the data that they employ. The secure element 20 also comprises, in memory, a collection of templates 255 to which profiles to be installed (and more precisely profile elements forming such profiles) make reference.

A main security domain, denoted ISD-R (issuer security domain root) 245, is the entity representative, in the secure element, of the SM-SR server 310. Thus, the ISD-R 245 and the SM-SR server 310 are able to communicate via the network 30 using a secure transport protocol. In its role as main security domain, the ISD-R 245 is also in charge of the management of the other security domains of the secure element 20. In particular, it is up to the ISD-R 245 to create another security domain ISD-P 250 (for issuer security domain profile) associated with an SM-DP server 320. Of course, other ISD-P security domains may be created within the secure element 20 by the ISD-R. In this case, other SM-DP servers may be provided within the manager 330.

Profiles may be loaded into one or more of these security domains, in order to be installed therein, optionally by way of update of a preceding profile.

In the context of the invention, the secure element 20 contains in its memory a collection 255 of one or more templates that are for example pre-installed by the manufacturer at the time of manufacture, or of installation of the secure element 20 into the host device 10, or that have been loaded, for example via a OTA channel, during the lifetime of the secure element (for example during the creation of a new ISD-P or of a new OS).

In certain embodiments, the ISD-R 245 is also responsible for managing the templates stored in the secure element (delivery of pieces of information on these templates, updated).

Generally, the SM-DP server 320 is configured to prepare the data of a profile in command-script or "installation-script" form, for example in the form of a list of C-APDU (APDU commands) such as defined in the standard ETSI TS 102 226. As mentioned above, such a profile comprises a plurality of profile elements generally formatted according to predefined templates accessible to the SM-DP server 320.

Whether it is a question of the collection of templates stored in the secure element 20 or accessible to the manager, the templates each contain metadata that include substantially the same pieces of information, namely in particular an OID and all or some of a version number (for example composed of a major version and a minor version) of the template, an expiry date of the template and a hash value or fingerprint of the template.

By way of illustration, the hash/fingerprint value may be based on the use of an SHA256 algorithm, applied to the values of the metadata and to the content (description of the profile element) of the template in question. This hash may be calculated upstream of when the template is stored in the memory of the secure element or of the manager, so as to be able to be stored at the same time as the other metadata forming the template.

According to the first embodiment of the invention, which embodiment was mentioned above, before the elements of a new profile to be loaded into a secure element are transmitted to the secure element, for example in response to an instruction to load a profile, the invention verifies that the templates present in the secure element indeed correspond (in terms of version for example) to those that have been used to format the profile elements of the profile to be loaded. If these templates differ, they are updated, for example at the secure element, before the script is transmitted.

According to the aforementioned second embodiment, the templates present in the secure element, and in particular their version, are identified in order to ensure that, in the SM entity 330 (manager), templates having the same versions are used to generate the profile elements forming the profile to be loaded.

Once the required templates have been updated, either in the secure element to correspond to those used to generate the profile to be loaded, or in the SM entity 330 so that the profile to be loaded is generated with the same versions as those stored in the secure element, the SM entity 330 is tasked with transmitting, to the secure element, the generated profile to be loaded, and therefore the various created profile elements that reference the templates used (via their OIDs).

To this end, the SM entity 330 is configured to partition or segment the installation script (i.e. the generated profile), for example depending on the profile elements that it contains, into a plurality of binary blocks forming packets to be transmitted to the secure element 20.

Conventionally, the SM entity 330 may communicate in a secure way with the ISD-R 245, to which it transmits the packets during secure sessions (for example using the secure protocol SCP81).

On reception, the ISD-R 245 decrypts each received packet and transmits it to the ISD-P 250. On reception of all or some of the packets, processing of the profile elements may start, this in particular consisting in gathering, in local memory, up-to-date or updated templates that are referenced by these received profile elements, and then in writing to the memory of the secure element the reassembled profile elements (after merging). The profile is then as a result installed (and therefore loaded) into the memory of the secure element.

Figure 2:
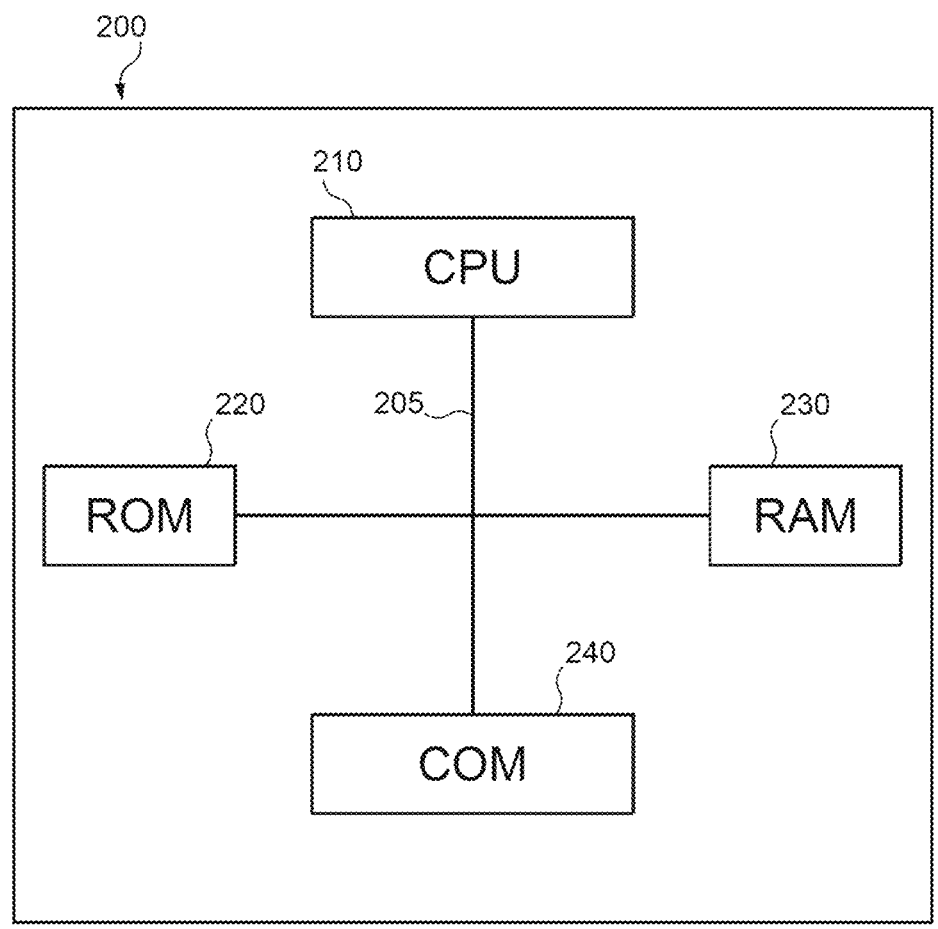
FIG. 2 schematically shows an example of one possible architecture for a secure element or a manager according to embodiments of the invention.

FIG. 2 schematically shows an example of one possible architecture for a secure element, for example the secure element 20 of FIG. 1, or a manager, for example the SM entity 330 of FIG. 1, according to embodiments of the invention.

This architecture 200 in particular comprises a communication bus 205 to which are connected:
- a processing unit 210—or microprocessor—denoted CPU (central processing unit);
- a nonvolatile memory 220 for example a ROM (read-only memory), EEPROM (electrically erasable read-only memory) or even a flash memory;
- a direct-access memory 230 or a cache memory or a volatile memory for example a RAM (for random access memory); and
- a communication interface COM 240 suitable for exchanging data with another entity via a network or a read/write interface (e.g. interface ISO 7816).

The direct-access memory 230 comprises registers suitable for recording variables and parameters created and modified during the execution of a computer program comprising instructions for implementing a method according to the invention. The instruction codes of the program stored in the nonvolatile memory 220 are loaded into the RAM memory 230 with a view to being executed by the CPU processing unit 210.

The nonvolatile memory 220 is for example a rewritable EEPROM memory or flash memory able to form a medium in the sense of the invention, i.e. able to comprise a computer program containing instructions for the implementation of steps of a method according to the invention.

In the context of the invention, it may in particular comprise the collection of templates stored in the secure element or in the manager 330.

Figure 3:
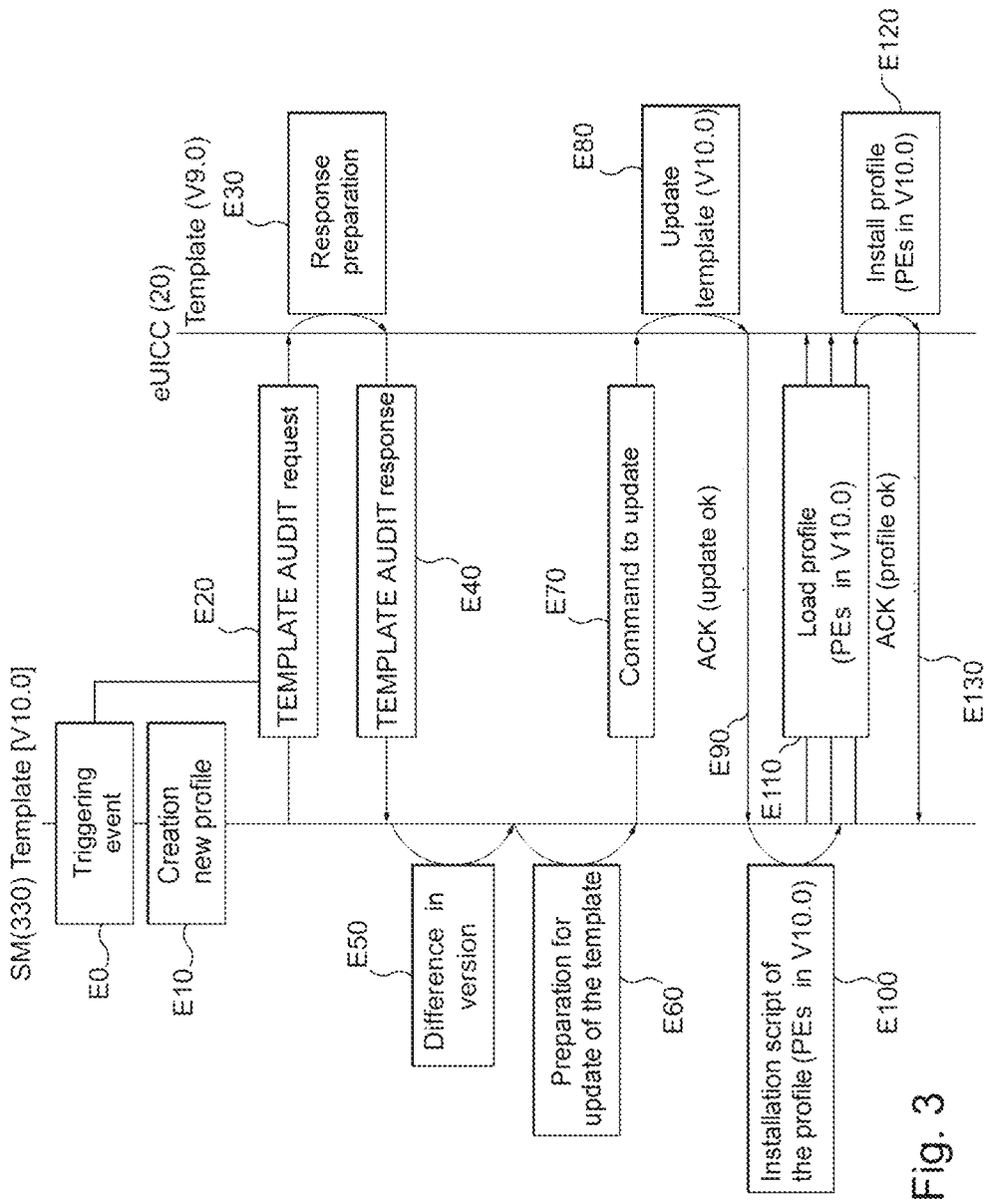
FIG. 3 shows, in the form of a timing diagram, steps of a managing method according to a first embodiment of the invention.

FIG. 3 shows, in the form of a timing diagram, steps of a managing method according to one realization of the aforementioned first embodiment of the invention. These steps may be implemented by the various elements shown in FIG. 1, in particular the SM entity 330 and the eUICC 20.

In this realization, in a step E10, the SM manager 330, via, for example, the SM-DP server 320, creates a new profile composed of profile elements formatted using one or more templates.

This step may be triggered by the occurrence (E0) of a triggering event among: the passage of a predefined amount of time measured by the manager; a demand, received by a third party, to load a new profile into the eUICC 20; the update of a template stored in a memory accessible to the manager; and the expiry of such a template.

This for example includes the SM entity 330 receiving an instruction to create a new profile and to load it into the eUICC 20. This instruction, whether manual or automatic, may, according to the circumstances, originate from a user of the host device 10 or indeed from an operator.

Furthermore, if a template stored locally by the manager has expired and therefore potentially updated, it is recommended to update the eUICC 20 with updated profiles relying on the new template.

By way of illustration, it is assumed that a single template has been used and that its version is denoted "V10.0" for 10th version. It will be recalled that the notion of template version has been created by the inventors to facilitate the management of templates given that they are each characterized by a single OID that remains unchanged when the template in question is modified/updated, for example when it changes format.

The representation of a version of a template is for example composed of two version numbers separated, for example, by a comma or a decimal point, corresponding to a major version number (integer value located, for example, before the decimal point) and a minor version number (decimal value located, for example, after the decimal point).

In our example, the version of the template being noted V10.0, this therefore corresponds to a major version number of "10" and a minor version number of "0".

In the described example, the eUICC 20 has, in memory, version V9.0 of the template in question. Therefore, in the example, the template stored in the memory of the eUICC 20 corresponds to an older version than the version of the template that the SM manager 330 has available to create a new profile to be loaded into the eUICC 20.

Of course, this is merely an illustrative example and the present invention is not limited thereto. Thus other template versions could be used, characterized by one or more different metadata (version number, expiry date, hash of the template) associated with the templates.

Furthermore, in response to the triggering event E0, the SM manager 330 seeks to verify the compatibility, with the target eUICC 20, of the profile created from one or more templates identified by their OIDs. To do this, the manager attempts to obtain at least one piece of information (metadatum) representative of a template version of at least one of the templates identified by the above OIDs and stored in the eUICC 20. This step may be carried out in parallel to step E10, or even before the latter.

To do this, in a step E20, the SM manager 330 generates and transmits, to the eUICC 20, an audit request aiming to obtain, in response, these pieces of information. This audit request may take the form of a command that is here noted TEMPLATE AUDIT REQUEST.

As described below, such a command allows pieces of information, corresponding to all or some of the metadata associated with one or more or all of the templates stored in the eUICC 20 to be obtained.

This TEMPLATE AUDIT REQUEST command is a creation of the inventors, and is therefore not described by the SIMALLIANCE.

The ASN.1 (for abstract syntax notation one) notation, which allows a data structure to be described in a standardized way, is here used to present the format of the created command, and likewise the data that compose it.

Thus, for example, the following format is proposed to describe the TEMPLATE AUDIT REQUEST command used:

```
TemplateAuditRequest::= SEQUENCE {
    templateARF    [PRIVATE    109]    SEQUENCE    OF
AuditRequestFilter }
```

It is therefore a command that includes a sequence of one or more templateARF elements in AuditRequestFilter format. The templateARF element defines the desired pieces of information (metadata) for one or more templates subject to the audit.

In detail, the AuditRequestFilter format of such an element may be as follows:

```
AuditRequestFilter ::= SEQUENCE {
    templateID OBJECT IDENTIFIER OPTIONAL,
    templataRTI requestedTemplateInformation    }
```

Once again it is a question of a sequence the first element templateID of which identifies the one or more templates subject to the audit, and the second element templateRTI of which lists the desired pieces of information (metadata) with respect to the one or more templates identified via the templateID element in question.

By way of purely illustrative example, a request may contain the following templateARF sequence, with respect to a demand regarding various templates (OID_1, OID_42, OID_13, OID_54, OID_5, OID_8), or even all the templates:

```
{
    [OID_1],
        [templateMajor-Version,
        templateExpirationDate],
    [OID_42, OID_13, OID_54,
        [templateMajor-Version,
        templateMinor-Version,
        templateExpirationDate],
    [OID_5],
        [ ],
    [OID_8],
        [templateMinor-Version]
    [ ],
        [templateHash]    }
```

In particular, the tenplateID field may comprise a list of OID identifiers uniquely identifying templates for which the pieces of metadata information are demanded. By list, it must be understood that at least one OID is contained therein. This is for example the case of the first block of the preceding example listing the OID OID_1 alone, but also of the second block listing the OIDs OID_42, OID_13 and OID_54.

In certain embodiments, "group" OIDs may be used and known to the manager and the secure elements. A group OID for example allows a family of templates to be designated using a single OID.

In certain embodiments, the absence of OID from the templateID field (i.e. an empty list) implicitly defines that all the templates stored in the eUICC 20 are targeted. This is the case of the last block of the preceding example.

The templateRTI field for its part lists the various pieces of information (metadata) desired in response, for each of the templates listed in the corresponding templateID field.

In one embodiment, if no information is indicated in this field (field empty for example), the latter may implicitly define that all of the metadata of the one or more templates in question is desired in return. This is for example the case of the third block of the preceding example applying to the OID_5.

By way of illustration, the templateRTI field may be composed of the requestedTemplateInformation element described below, to have the various demanded pieces of information listed:

```
requestedTemplateInformation::= SEQUENCE {
    templateMajor-Version UInt8 OPTIONAL,
    templateMinor-Version UInt8 OPTIONAL,
    templateEpirationDate DATE OPTIONAL,
    templateHash OCTET STRING OPTIONAL    }
```

It is a question in this example of a list defining whether a version number of the one or more templates in question and/or an expiry date of the one or more templates in question and/or a hash value calculated from each template in question is/are desired.

In particular, templateMajor-Version is a field that, when it is positioned in the command, indicates that the main, i.e. major, version number (for example of unsigned integer (UInt8) type) of the one or more templates targeted (in the templateID field) is desired.

If, for example, the targeted template is in version V1.3, then the value that is returned by the templateMajor-Version field is 1.

templateMinor-Version is a field that, when it is positioned in the command, indicates that the sub-version number (for example of unsigned integer (UInt8) type) of the one or more targeted templates is desired.

If, for example, the targeted template is in version V1.3, then the value that is returned by the templateMinor-Version field is 3.

templateExpirationDate is a field that, when it is positioned in the command, indicates that the expiry date of the one or more targeted templates is desired.

templateHash is a field that, when it is positioned in the command, indicates that the hash/fingerprint value associated with each of the one or more targeted templates is desired.

The TEMPLATE AUDIT REQUEST command therefore makes it possible to demand one or more pieces of information (metadata) relative to one or more templates stored in the memory of the eUICC 20. The requestTemplateInformation field defines these desired pieces of information, whereas the templateID field defines the one or more targeted templates.

It will be noted that a TEMPLATE AUDIT REQUEST command formatted with an empty list of desired pieces of information (requestedTemplateInformation) demands all the pieces of information (metadata) of at least one targeted template, as referenced in the not empty list templateID.

A TEMPLATE AUDIT REQUEST command formatted with an empty template-identification list (templateID) demands the at least one piece of information (metadata) referenced in the not empty list requestedTemplateInformation, for all the templates stored in the memory of the eUICC 20.

Lastly, a TEMPLATE AUDIT REQUEST command formatted with an empty template-identification list (templateID) and an empty list of desired pieces of information (requestedTemplateInformation) therefore demands all the pieces of information (metadata) for all the templates stored in the memory of the eUICC 20.

The list of aforementioned fields is in no way limiting and other fields may be provided. For example, other fields defining the desired pieces of information within the metadata associated with the templates may be provided to make the demanded pieces of information vary.

In order for the eUICC 20 to be able to understand the TEMPLATE AUDIT REQUEST command, the latter, presented above in ASN.1 format, is converted, before transmission, by the SM manager 330 into a format that is understandable to the eUICC. For example, it is converted into a command of "case 4" type according to the description given in the standard ISO 7816-4 (for example, a GET DATA command of the GlobalPlatform standard), based on a TLV (for tag length value) structure.

The GET DATA command representative of the TEMPLATE AUDIT REQUEST is thus transmitted by the manager to the eUICC 20, which therefore receives it.

In a step E30, the request comprising the GET DATA command, corresponding to a representation that is exploitable by the ISD-R of the ASN.1 description of the TEMPLATE AUDIT REQUEST command (templateAuditRequest) is processed by the ISD-R of the eUICC 20.

This processing comprises gathering the locally stored templates that are identified by the OIDs of the one or more templateID fields of the request, then gathering the demanded pieces of information such as identified in the one or more corresponding templateRTI fields. As indicated above, it is for example a question of the main version and/or sub-version and/or the expiry date and/or the hash value of each targeted template.

These pieces of information are compiled into a response to the GET DATA command. Just as for the TEMPLATE AUDIT REQUEST, this dedicated response is a creation of the inventors. By way of illustration, this response, denoted TesplateAuditResponse, may be structured as follows, in ASN.1 format:

TemplateAuditResponse::= SEQUENCE {
   templateList SEQUENCE OF TemplateOT,
   constructorID OBJECT IDENTIFIER OPTIONAL,
   templateSignature OCTET STRING OPTIONAL }

It is a question of a list in which a first portion is a sequence of one or more fields or elements, templateList, in the TemplateOT format (described below), that each list a template identifier (OID) targeted by the TEMPLATE AUDIT REQUEST command and finally found in the eUICC 20, and the demanded pieces of information that are associated therewith. In particular, if the audit request does not indicate any particular templates (tenplateID list empty) and/or any particular demanded piece of information (requestedTemplateInformation list empty), this templateList sequence allows each template stored in the eUICC 20 and the returned pieces of information to be identified.

If no targeted template is present in the eUICC 20 (for example the eUICC contains no templates), then no pieces of information are returned in the response. More generally, if a targeted template is not in the memory of the eUICC, then no corresponding pieces of information are returned in the templateList field of the response. This will allow the manager to determine which templates are missing (with respect to the targeted list).

The following is one example of an ASN.1 representation of the TemplateOT element:

TemplateOT::= SEQUENCE {
   templateID OBJECT IDENTIFIER,
   templateContent OCTET STRING OPTIONAL,
   templateMajor-Version UInt8 OPTIONAL,
   templateMinor-Version UInt8 OPTIONAL,
   templateExpirationDate DATE OPTIONAL,
   templateRash OCTET STRING OPTIONAL     }

It is a question of a list for a particular template (identified by the templateID field indicating the corresponding OID) specifying the pieces of information demanded for this template: templateMajor-Version (the main, i.e. major version number), templateMinor-Version (sub-version number), templateExpirationDate (expiration date) and/or templateHash (hash or fingerprint value).

The templateContent field (described below with reference to the command to update a template) is not used in the TEMPLATE AUDIT REQUEST command. It could be removed from this description of the audit request. However, for the sake of conciseness, it has been chosen to use the same TemplateOT format in this request and in the command to update a template described below.

Of course, other pieces of information may also be demanded, provided that they are provided (as metadatum associated with the templates).

The other fields, constructorID and templateSignature, of the TEMPLATE AUDIT RESPONSE are optional and allow the response originating from the eUICC 20 to be authenticated.

In particular, the constructorID field may comprise an identifier of the manufacturer of the eUICC 20. This piece of information may allow the manager to identify, for example, from which server or manufacturer the update for the templates of the eUICC in question should be got.

The templateSignature field may contain a cryptographic signature of the TemplateAuditResponse. It may be a question of a signature of all of the response or of the returned pieces of information (in particular the sequence of fields templateList), for example using an encryption key of the ISD-R in a private key/public key mode. The SM manager 330 (for example, SM-SR or SM-DP) may then verify the received signature. This verification thus allows the origin of the template and/or of the returned metadata to be authenticated.

The TEMPLATE AUDIT RESPONSE thus allows all the pieces of information associated with the templates targeted by the audit request and stored by the eUICC in memory to be delivered to the SM manager 330. The eUICC 20 may not contain certain templates targeted by the request, in which case the response returns no pieces of information thereon.

Once generated, the TEMPLATE AUDIT RESPONSE is transmitted by the eUICC 20 to the SM manager 330 in a step E40, allowing the latter to obtain one or more pieces of information representative of a version of a profile-element template stored in the memory of the secure element.

On reception, the SM manager 330 optionally verifies the signature of the response using the aforementioned encryption key in order to verify the authenticity of the response.

Next, in a step E50, the SM manager 330 compares the received pieces of information with pieces of information associated with the template or with the templates that were used to create, in step E10, the new profile to be loaded. This comparison makes it possible to determine whether there is a difference in version between each template version obtained via the received pieces of information and a version of the same template (i.e. with the same OID identifier) stored in a memory accessible to the manager and used to generate the profile in step E10.

In one embodiment, the comparison is based on a version number associated with the template in question.

It will be noted that two templates referenced by the same OID but having different main versions (for example V1.1 for one of the templates (i.e. a templateMajor-version value of 1) and V2.1 for the other (i.e. a templateMajor-version value of 2)) are incompatible, i.e. data formatted with one of these templates cannot be understood using the other template (for example, the length of a datum of the template in question differs from one version to the next) It may then be desirable to update the template.

In contrast, two templates referenced by the same OID and having the same main version but different sub-versions (for example V1.1 for one of the templates (i.e. a templateMinor-version value of 1) and V1.2 for the other (i.e. a templateMinor-version value of 2)) may be backward compatible, i.e. data formatted with one of these templates may be understood using the other template, even though errors may appear due, for example, to a difference in the value of data of the template (for example modification of a value stored in a file or indeed, for example, modification of a parameter used to carry out an authentication). Once again, an update may then be desirable.

The SM manager 330 may therefore gather the main version number and/or the sub-version number of the template used to create the profile in step E10 (V10.0 in the example of FIG. 3), also gather the main version number and/or sub-version number of the same template (same OID), such as delivered in the TEMPLATE AUDIT RESPONSE received in step E40 (V9.0 in the example of FIG. 3), then compare these two numbers to each other.

In the example of FIG. 3, the SM manager 330 is thus capable of determining whether there is a difference in versions.

In another embodiment, the comparison relies on the expiry date associated with the templates. Conventionally, the SM manager 330 has, in memory, the latest versions of the templates, because it is easier to update the manager than a multitude of eUICCs spread far and wide.

The comparison E50 may directly compare the (up-to-date) expiry date of the template used to create the profile in step E10 with the expiry date of the same template (same OID) as provided in the TEMPLATE AUDIT RESPONSE received in step E40.

More simply, the SM manager 330 may simply compare the expiry date received in the TEMPLATE AUDIT RESPONSE with the present time, to determine directly whether the received expiry date has been exceeded, reached or not.

In another embodiment, the comparison relies on the hash value associated with the templates.

The hash value alone allows an overall difference between two templates (the template used to create the profile to be loaded, and the other template stored in the eUICC) to be detected and therefore makes it possible to determine whether there is a difference in version between these templates. It also allows the integrity of the templates in their entirety (metadata and content) to be assured and makes it possible to detect, more finely, a potential overall difference in the content of the two templates (referenced by the same OID).

In practice, the SM manager 330 calculates the hash value for the template used to create the new profile in step E10, or gathers said value if it is already available (for example in the metadata associated with this template). The manager then compares this hash value to the hash value contained in the TEMPLATE AUDIT RESPONSE for the same template (with the same OID).

More sophisticatedly, the number of the main version and/or of the sub-version and/or the expiry date and/or the hash value of the template allows a finer granularity to be obtained in the comparison of two templates having the same OID (one used to create the profile to be loaded, and the other stored in the eUICC) and therefore in the deduction of at least one difference in version therebetween.

Specifically, a hash-value comparison associated with a comparison of one or more other values (metadata) among those returned advantageously makes it possible to detect where the difference between two templates having the same OID is located, i.e. either in one of the metadata associated with the templates, or in the content thereof.

Thus, a determination of a difference in version may be based on pieces of information of different natures.

In step E50, the SM manager 330 thus determines whether there is a difference between a template used to create the new profile and the template having the same OID in the eUICC. Of course, this operation is preferably carried out for each template used to create the new profile.

If by chance the eUICC 20 does not deliver a piece of information on a template targeted by the audit request (generally because it does not have a version in memory), a difference in version is automatically detected by the SM manager 330.

If no difference in version is observed in step E50 on the basis of the pieces of information received in E40, the method passes directly to a step E100 that will be described below.

In one embodiment, the SM manager 330 is capable, on the basis of the received pieces of information, of determining whether a given difference in version is minimal, i.e. such as to allow satisfactory operating compatibility (not sufficiently different to lead to problems, during the processing of the corresponding profile element, of a nature to prevent the installation or execution of the new profile). This is for example the case if the two templates differ only by one sub-version. In this case, the template in the eUICC 20 may not be updated and the method passes directly to step E100.

In contrast, if a large difference in version is detected, the version of the template in the eUICC 20 is not compatible with the created profile to be loaded. This situation then requires the template present in the eUICC to be updated. This update may consist in updating at least one of the metadata and/or the content of the targeted template.

Moreover, in case of absence, in the memory of the eUICC 20, of a targeted template version, the SM manager

330 may then decide to load this template into the eUICC 20. This loading is also an update of the template.

Thus, in the step E60, the SM manager 330 prepares the update of the template. In this context, the SM manager 330 may optionally gather, upstream, the up-to-date template from a dedicated server of the manufacturer indicated in the constructorID parameter returned in the TEMPLATE AUDIT RESPONSE. This preparation E60 comprises generating one (or more than one) command to update intended for updating the template in the eUICC.

Of course, a plurality of updates are carried out if the TEMPLATE AUDIT RESPONSE allows a plurality of large differences in version to be identified between the templates used to create the new profile to be loaded and the corresponding templates stored in the eUICC 20.

For example, the description, in ASN.1 format, of the generic update command may be as follows:

```
StoreDataTemplateUpdate::= SEQUENCE {
    templateTU [PRIVATE 109] TemplateUpdate    }
```

It is a question of a command that contains a single field templateTU in the TemplateUpdate format. The templateTU field identifies one or more templates (via their OIDs) and delivers the data/pieces of information to update (a datum being at least one parameter of the metadata of the template and/or a content datum of the template).

In detail, the TemplateUpdate format of such a field may be as follows:

```
TemplateUpdate::= SEQUENCE {
    templateToUpdate SEQUENCE OF TemplateOT,
    templateSignature OCTET STRING OPTIONAL    }
```

It may be a question of a list in which a first portion is a sequence of one or more of the above described templateOT fields forming the templateToUpdate element.

Each field corresponds to a template (identified by its OID in the tenplateID) and delivers the pieces of information to be updated, which include all or some of the very contents of the template (templateContent), the main, i.e. major, version number (templateMajor-Version), the sub-version number (templateMinor-Version), the expiry date (templateExpirationDate) and the fingerprint or hash value (templateHash).

The templateContent content of the template, which forms part of the fields making up the TemplateOT, is the template per se, i.e. all of the data or values describing, by default, a profile element, for example the size of a file, length of a record, value of a parameter, etc. In the context of the example of FIG. 3, it may be a question of the data and values of the V10.0 template. As a variant, only differences in data and values between version V9.0 (held by the eUICC) and the version V10.0 are transmitted. In one embodiment with update, all or some of the metadata and of the content, the hash value is still present. Specifically, the calculation of this value depends on the value of the metadata and content of the template and therefore, if there is the slightest change, the hash value is preferably recalculated and forms part of the update so that the latter is accepted during the inspection, by the eUICC, of the hash value taking into account this change. Also, the main-version and sub-version numbers are generally updated when the content of the template is modified. The ability to be able to update only the expiry date is provided for, accompanied by the new hash value of the template, i.e. the value inherent to this update of the expiry date.

The following field, templateSignature, contains an optional cryptographic signature of the command to update. It is for example calculated from all of the templateToUpdate field using an encryption key of the SM manager 330 in a private key/public key mode. This signature allows the eUICC that receives the command to update to authenticate the origin of the received data (i.e. of the template or of the templates in question).

In order for the eUICC 20 to be able to understand the command to update, the latter, represented above in ASN.1 format, is converted, before transmission, by the SM manager 330 into a format that is understandable by the eUICC. For example, it is converted into a STORE DATA command of the GlobalPlatform standard, based on a TLV (for tag length value) structure.

Depending on the length of the data of the command to update (repetition of a plurality of structures, each including one OID and the pieces of information/contents to be updated of the template in question), one or more STORE DATA commands may be used. For example, a STORE DATA command may be used for each template.

In the particular case where the TEMPLATE AUDIT RESPONSE makes it possible to identify that a template is missing from the card (applicable to a plurality of missing templates), the command to update in fact consists of a command to create this missing template. The same STORE DATA command is used.

The STORE DATA command representing the command to update is thus transmitted in step E70 by the manager to the eUICC 20, which therefore receives it. This transmission is for example carried out over an OTA channel based (for example) on the secure transport protocol SCP080 in case of use of the SMS (short message service) communication protocol, or based on the secure transport protocol SCP081 in case of use of an HTTPS communication protocol.

The command to update falls within the scope of remote management of the secure element, which may be of RAM (for remote application management) type, or even of RFM (for remote file management) type.

In a step E80, the eUICC 20 therefore receives the one or more commands to update (STORE DATA) and executes it or them in a conventional way. This is the actual update of the one or more templates.

The execution may in particular comprise the verification of the templateSignature signature in order to guarantee the origin of the command (or of the commands) to update received.

The execution may also comprise the verification of the integrity and origin of the various data and pieces of information forming each field of the templateOT element constituting the templateToUpdate element. To do this, the eUICC may calculate its own hash value on the basis of the data and pieces of information received and contained in a given templateOT element, which data/pieces of information are complemented by those actually stored in memory and relating to the same OID if a portion of the data and pieces of information are not present in the fields of the templateOT element in question of the received templateToUpdate element. Next, the eUICC compares said value with the hash value received for the same templateOT element representing a given template. Thus, if the two hash values are not identical, the template in question (i.e. the templateOT element in question constituting the templateToUpdate element) is rejected by the eUICC, without the other templateOT elements, which are also constituents of the templateToUpdate element, necessarily being rejected (if their hash-value verification is correct). Likewise, if a hash value does not form part of the pieces of information received for a given templateOT field, the latter will be rejected by the eUICC.

In the example of FIG. 3, the step E80 allows the eUICC to update the template in question (initially in version V9.0) to its version V10.0.

Once the update (or updates) has (have) being carried out, the eUICC transmits an acknowledgement (step E90) to the SM manager 330.

In step E100, the SM manager 330 transmits the installation script of the new profile created in E10 on the basis of the version V10.0 of the template.

In practice, the transmitted profile elements are loaded sequentially into the eUICC 20 (step E110), then the profile is formed by merging, where appropriate, the received profile elements with the V10.0 template updated in E80 (and any other template stored in the eUICC, optional update according to the teachings of the invention), and is installed (step E120). These steps of loading the profile are conventional steps.

In a step E130, the eUICC 20 informs the SM manager 330 that the installation of the profile has gone well.

The above examples are based, for simplicity, on a single template (of version V10.0) used in the creation of the profile in step E10. The invention is not however limited to a single template and covers the case where a plurality of templates are used (and therefore targeted in the audit request and optionally updated). Those skilled in the art will find it easy to apply the above teachings to the case where a plurality of templates are concerned. The commands described in the present document are moreover provided for one or more templates (i.e. one or more OIDs).

In the above examples, the SM manager 330 transmits an audit request in reaction to a triggering event.

The present invention also relates to other embodiments, not involving the use of an audit request.

For example, the eUICC 20 may spontaneously transmit the TEMPLATE AUDIT RESPONSE to the SM manager 330, for example at regular intervals. Practically, the eUICC 20 may obtain, from the host device 10, a time reference on which to base the periodicity of transmission of such a response. For example, the eUICC 20 may consent with the host device 10 to periodically transmit commands (for example status commands) on the reception of which the eUICC 20 increments a reference time counter. When the counter reaches the end of a new preset period, the eUICC spontaneously constructs the TEMPLATE AUDIT RESPONSE with pieces of information on all of the templates that it contains in memory.

According to another variant, the eUICC 20 spontaneously transmits a notification to the SM manager 330, by way of a TEMPLATE AUDIT RESPONSE, on the occurrence of particular events such as, for example, the update of the OS (operating system) of the eUICC or even the lapsing of certain templates (i.e. when their expiry date is reached or exceeded).

The update of the OS may be commanded by the SM manager 330.

In this particular mode of update of the OS, the transmission of the TEMPLATE AUDIT RESPONSE by the eUICC is in response to a prior step in which the operating system of the eUICC is updated by the manager.

In one embodiment, the TEMPLATE AUDIT RESPONSE contains pieces of information on each template that the eUICC contains in memory, since the manager was unable to indicate to the eUICC which templates were of interest.

As a variant, the TEMPLATE AUDIT RESPONSE contains pieces of information on only those templates that the eUICC contains in memory and that were updated at the same time as the operating system.

To achieve this, the eUICC 20 may store in memory, prior to the update of the OS, pieces of metadata information (OID and/or major versions and/or minor versions and/or expiry dates and/or hash value) of the templates stored in the memory of the eUICC. Next, once the OS has been updated, a comparison is carried out, by the eUICC, between the pieces of metadata information of the templates then stored in the memory of the eUICC and the corresponding pieces of metadata information such as stored in memory before the update of the OS. This comparison allows templates that have been modified during the update of the OS to be easily identified.

In one particular embodiment, the event relating to the update of the OS may be combined with another event to trigger the (spontaneous) transmission of the TEMPLATE AUDIT RESPONSE by the eUICC. For example, this other event may comprise a first network authentication or connection post OS update, or indeed a toolkit-type event, or indeed any other type of event.

Thus, according to another variant of the first embodiment described above, in which variant the eUICC 20 has available to it a more recent template version [V9.0] than the SM manager 330 [V8.0], the update E80 of the template may consist in installing an old version of the template into the eUICC (here V8.0). This makes it possible, when the SM manager 330 has already calculated the new profile to be loaded on the basis of the old version of the template, to not have to recalculate the profile. A subsequent update of the template in the server and/or in the eUICC could then be envisioned.

Figure 4:
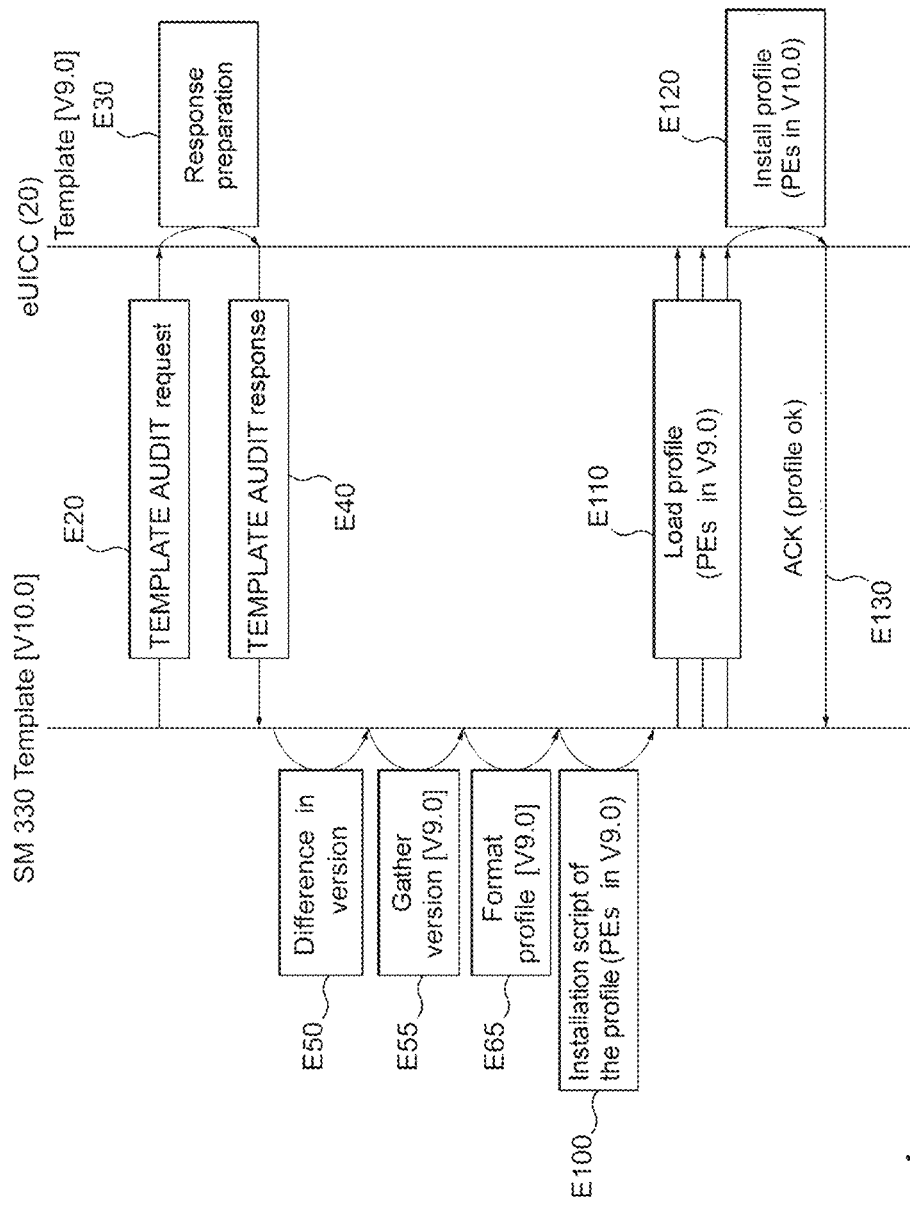
FIG. 4 shows, in the form of a timing diagram, steps of a managing method according to a second embodiment of the invention.

FIG. 4 shows, in the form of a timing diagram, steps of a managing method according to a second embodiment of the invention. These steps may be implemented by the various elements shown in FIG. 1, in particular the SM manager 330 and the eUICC 20.

In this example, steps that are similar to those of the example of FIG. 3 have been given identical reference numbers. Furthermore, unless specified otherwise, FIG. 3 should be referred to for a description of these steps. Just as above, the eUICC stores a profile-element template in version V9.0. The SM manager 330 may, for its part, store no corresponding template (i.e. having the same OID) or store a corresponding template in another version, for example V10.0.

In this second embodiment, the method comprises the SM manager 330 transmitting a TEMPLATE AUDIT REQUEST to the eUICC 20 (step E20), the eUICC processing (step E30) the request and the SM manager 330 receiving (step E40) a TEMPLATE AUDIT RESPONSE originating from the eUICC 20. The explanations given above (FIG. 3) with reference to these steps also apply here.

Moreover, the variants based on the spontaneous transmission of the TEMPLATE AUDIT RESPONSE by the eUICC 20 (at regular intervals, following an update of the OS, optionally in combination with another event) may also be envisioned.

If the SM manager 330 already has in memory a template having the same OID as that listed in the received response, it may compare, in step E50, the received pieces of information with the pieces of information associated with the template that it already has in memory. This step makes it possible to determine whether there is a difference in version between the two templates. Of course, step E50 is carried out for all of the templates for which a piece of information is returned in the response.

This step is optional in that the SM manager 330 may not have such a template in memory or may, even though it has a corresponding template already in memory, pass directly to step E55.

It will be noted that the absence of a template in memory implicitly corresponds to the detection of a difference in version between the template stored in the eUICC and the (hypothetical) corresponding template stored in the manager.

In a step E55, which is carried out either following the reception (E40) of the audit response or following a detection of a difference in versions in step E50, the SM manager 330 processes the received pieces of information in order to identify the version of the template stored in the eUICC 20, here V9.0. Next, the SM manager 330 gathers the same template version, for example from its own memory or from an external or internal database or even from a server, for example the dedicated server of the manufacturer of the eUICC, identified by the value of the constructorID field of the response. It then stores it in memory, replacing the template (with the same OID) that it possibly already had in memory therewith.

Of course, this step is carried out for all of the templates for which a piece of information is returned in the response or for all of the templates for which a difference in version is determined in step E50.

In a step E65, similar to the step E10 described with reference to FIG. 3, the SM manager 330 may then create a new profile composed of profile elements formatted using templates having the same characteristics (metadata and content) as the templates present in the eUICC.

In our example, the SM manager 330 generates a new profile a profile element of which is created by reference to version V9.0 of the template. Advantageously, the profile thus formatted is suitable for the one or more templates present in the eUICC 20.

The following steps consist in transmitting the profile to the eUICC 20 via the SM manager 330 (steps E100 and E110) then in installing it using the templates (the template V9.0 in our example) stored in the eUICC 20 (step E120). The SM manager 330 is then informed that the installation has been carried out correctly (step E130).

In this second embodiment, the update of the template in case of difference in version takes place in the manager 330 (by replacement of the old template or by loading of the template if the manager does not already hold another version) and prior to the step of generating the new profile. It makes it possible to make the updated template correspond with the version held by the eUICC (and therefore such as indicated in the last response received by the manager) when it decides to create the new profile. Thus, the new profile to be loaded into the eUICC is generated on the basis of the updated template.

The preceding examples are merely embodiments of the invention, which is not limited thereto.

The invention claimed is:

1. A method for loading a profile into a memory of an embedded secure element (eSE) configured to store multiple profiles, the method comprising, in a server remote from the eSE, the following steps:
   receiving, from the eSE, a piece of information representative of a version of a profile-element template stored in the memory of the eSE, wherein the template defines a format of data of profile elements forming the profile, which identifies a subscriber to access services provided by a mobile network operator when the profile is activated;
   comparing the received piece of information with information representative of a template version associated with a same template stored in a storage of the remote server for generating a new profile, and determining therefrom whether a difference in version exists between the template stored in the memory of the eSE and the same template stored in the storage of the remote server;
   in a case where said determining determines that the difference in version exists, sending, to the eSE, an updating command that one of updates the template stored in the memory of the eSE or updates the template stored in the remote server, in order to align respective versions of the template stored in the memory of the eSE and the template version associated with the same template stored in the storage of the remote server;
   generating a profile including a profile element formatted using the aligned version of the template stored in the remote server, the generated profile including a reference to the template without the template itself and including profile information complementing the template; and
   subsequently to the step of sending said updating command, transmitting, to the eSE, the generated profile so that the eSE accesses the services provided by the network operator when the generated profile is activated in the eSE.

2. The method according to claim 1, furthermore comprising:
   transmitting a request comprising a command in order to obtain, in response, said piece of information.

3. The method according to claim 2,
   wherein said step of determining a difference comprises determining a difference between the obtained version of the template stored in the memory of the eSE and the version of the template used to generate the profile to be sent,
   and the step of updating in case of difference comprises transmitting a command to update the template stored in the memory of the eSE to the template used to generate the profile to be sent.

4. The method according to claim 2, wherein the step of updating in case of difference comprises, prior to the generating step, updating the template to the generating step, updating the template correspond to the obtained version of the template of the eSE, so that the profile to be sent is generated using the updated template.

5. The method according to claim 2, wherein the piece of information representative of a version of the profile-element template comprises one or more among: a version number of said template, an expiry date of said template and a hash value calculated from said template.

6. The method according to claim 1, wherein the step of obtaining said piece of information is in response to a prior step in which an operating system of the eSE is updated by the remote server.

7. The method according to claim 6,
   wherein said step of determining a difference comprises determining a difference between the received piece of information on the template stored in the memory of the eSE and the version of the template used to generate the profile to be sent, and the step of updating in case of difference comprises transmitting a command to update the template stored in the memory of the eSE to the template used to generate the profile to be sent.

8. The method according to claim 6, wherein the step of updating in case of difference comprises, prior to the generating step, updating the template to the generating step, updating the template correspond to the obtained version of the template of the eSE, so that the profile to be sent is generated using the updated template.

9. The method according to claim 1,
wherein said step of determining a difference comprises determining a difference between the received piece of information on the template stored in the memory of the eSE and the version of the template used to generate the profile to be sent,
and the step of updating in case of difference comprises transmitting a command to update the template stored in the memory of the eSE to the template used to generate the profile to be sent.

10. The method according to claim 1, wherein the step of updating in case of difference comprises, prior to the generating step, updating the template to the generating step, updating the template correspond to the obtained version of the template of the eSE, so that the profile to be sent is generated using the updated template.

11. The method according to claim 1, wherein the piece of information representative of a version of the profile-element template comprises one or more among: a version number of said template, an expiry date of said template and a hash value calculated from said template.

12. A non-transitory data medium readable by a microprocessor, comprising instructions of a computer program for implementing a method according to claim 1 when they are loaded and executed by the microprocessor.

13. A method for loading a profile into a memory of an embedded secure element (eSE) configured to store multiple profiles, comprising, in the eSE, the following steps:
transmitting, to a remote server, a piece of information representative of a version of a profile-element template stored in the memory of the eSE, the profile-element template defining a format of data of profile elements forming the profile, which identifies a subscriber to access services provided by a mobile network operator when the profile is activated;
in response to said transmitting, receiving and executing a command for updating the profile-element template stored in the memory, said command being transmitted by the remote server;
subsequent to the executing the command for updating of the profile-element template stored in the memory, receiving a profile to be loaded, said profile being transmitted by the remote server, the profile to be loaded including at least one profile element formatted by way of the template stored in the memory and including a reference to the template without the template itself and including profile information complementing the template, and
loading and installing, into the memory, the received profile by merging the received profile with the stored template based on which an element of the received profile is formatted, so that the eSE accesses the services provided by the network operator when the generated profile is activated in the eSE.

14. The method according to claim 13, wherein the step in which said piece of information is transmitted by the eSE is in response to the reception of a request sent by the remote server, comprising a command to obtain, in response, said piece of information.

15. The method according to claim 13, wherein the step in which said eSE transmits said piece of information is in response to a prior step of receiving an updating command sent by the remote server to update the operating system of the eSE and of updating the operating system.

16. The method according to claim 15, wherein the eSE transmits a said piece of information representative of a profile-element-template version for each template stored in the memory of the eSE or solely for each template stored in the memory of the eSE that was modified during the prior update of the operating system.

17. A profile manager for the personalization of an embedded secure element (eSE) by profile loading, the manager comprising at least one microprocessor configured to:
receive, from the eSE, a piece of information representative of a version of a profile-element template stored in a memory of the eSE, wherein the profile-element template defines a format of data of profile elements forming the profile, which identifies a subscriber to access services provided by a mobile network operator when the profile is activated,
compare the received piece of information with information representative of a template version associated with a same template stored in a memory of the manager for generating a new profile, and determine therefrom whether a difference in version exists between the template stored in the memory of the eSE and the same template stored in the memory of the manager,
on determining that a difference in version exists, update at least one among the template stored in the memory of the eSE and the template stored in the memory of the manager so as to align the respective versions,
generate a profile including a profile element formatted using the aligned version of the template stored in the memory of the manager, the generated profile including a reference to the template without the template itself and including profile information complementing the template, and
subsequently to the update of the at least one among the template stored in the memory of the secure element and the template stored in the memory of the manager, transmitting the generated profile to the eSE, so that the eSE accesses the services provided by the network operator when the generated profile is activated in the eSE.

18. The profile manager according to claim 17, wherein the microprocessor is furthermore configured to transmit a request comprising a command to obtain, in response, said piece of information, or to transmit a command to update an operating system of the eSE in order to obtain, in response, said piece of information.

19. A personalizable embedded secure element (eSE) configured to store multiple profiles, comprising at least one microprocessor configured to:
transmit, to a remote server, a piece of information representative of a version of a profile-element template stored in a memory of the eSE, wherein the profile-element template defines a format of data of profile elements forming the profile, which identifies a subscriber to access services provided by a mobile network operator when the profile is activated, in response to the transmitting, receive and execute a command to update the profile-element template stored in the memory, said command being transmitted by the remote server, subsequently to executing the command to update the profile-element template stored in the memory, receive a profile to be loaded, which is transmitted by the remote server, the profile to be loaded including at least one profile element formatted using the template stored in memory, the profile including a reference to the template without the template itself and including profile information complementing the template, and load and install, into memory, the received profile by merging the received profile with the stored template based on which an element of the received profile is formatted, so that the eSE accesses the services provided by the network operator when the generated profile is activated in the eSE.

20. The personalizable eSE according to claim 19, wherein the microprocessor is furthermore configured to generate and transmit said piece of information in response to the reception of a request sent by the remote server, comprising a command to obtain, in response, said piece of information, or in response to a prior step in which the operating system of the eSE is updated by the remote server.

* * * * *